United States Patent
Sanchez

(10) Patent No.: US 11,861,722 B2
(45) Date of Patent: Jan. 2, 2024

(54) SYSTEMS AND METHODS FOR GENERATING AND UPDATING AN INVENTORY OF PERSONAL POSSESSIONS OF A USER FOR INSURANCE PURPOSES

(71) Applicant: BlueOwl, LLC, San Francisco, CA (US)

(72) Inventor: Kenneth Jason Sanchez, San Francisco, CA (US)

(73) Assignee: BLUEOWL, LLC, San Francisco, CA (US)

(*) Notice: Subject to any disclaimer, the term of this patent is extended or adjusted under 35 U.S.C. 154(b) by 259 days.

(21) Appl. No.: 16/793,810

(22) Filed: Feb. 18, 2020

(65) Prior Publication Data
US 2023/0022540 A1    Jan. 26, 2023

(51) Int. Cl.
  *G06Q 40/08*  (2012.01)
  *G06F 16/9535*  (2019.01)
  *G06Q 30/02*  (2023.01)

(52) U.S. Cl.
  CPC .......... *G06Q 40/08* (2013.01); *G06F 16/9535* (2019.01); *G06Q 30/0278* (2013.01)

(58) Field of Classification Search
  CPC .................................................... G06Q 40/08
  See application file for complete search history.

(56) References Cited

U.S. PATENT DOCUMENTS

| | | | |
|---|---|---|---|
| 7,107,239 B2 | 9/2006 | Graff | |
| 7,941,330 B1 * | 5/2011 | Buentello | G06Q 40/08 705/4 |
| 8,041,636 B1 | 10/2011 | Hunter et al. | |
| 8,335,700 B2 | 12/2012 | Zizzamia et al. | |
| 8,543,430 B1 | 9/2013 | Fields et al. | |
| 9,836,792 B2 | 12/2017 | Dixon | |
| 9,836,793 B2 | 12/2017 | Busque et al. | |
| 10,176,532 B1 | 1/2019 | Hanson et al. | |
| 10,210,577 B1 | 2/2019 | Davis et al. | |
| 10,223,750 B1 * | 3/2019 | Loo | G06Q 40/08 |
| 10,262,375 B1 | 4/2019 | Howard | |
| 10,300,373 B2 | 5/2019 | Hickman et al. | |
| 10,311,521 B1 | 6/2019 | Capone et al. | |
| 10,339,604 B1 | 7/2019 | Cook | |
| 10,593,109 B1 | 3/2020 | Floyd | |
| 10,977,734 B1 | 4/2021 | Kenney | |

(Continued)

*Primary Examiner* — Edward Chang
(74) *Attorney, Agent, or Firm* — BRYAN CAVE LEIGHTON PAISNER LLP

(57) ABSTRACT

A computing system for generating a list of items predicted to be associated with a candidate user may be provided. The computing system may include a processor in communication with a memory device, and the processor may be configured to generate a predictive possession model, receive personal data associated with the candidate user, predict a first set of items owned by the candidate user, assign a value and a range of predesignated values for each item included in the first set of items, cause the first set of items and their corresponding values to be displayed on a user device of the candidate user, and prompt the candidate user to input confirmation data including one of a confirmation that the first set of items accurately describes a set of actual items possessed by the candidate user and a confirmation that the values corresponding to the first set of items are satisfactory.

17 Claims, 6 Drawing Sheets

(56) References Cited

U.S. PATENT DOCUMENTS

| | | |
|---|---|---|
| 2002/0062249 A1 | 5/2002 | Iannacci |
| 2007/0118410 A1 | 5/2007 | Nadai |
| 2010/0044430 A1 | 2/2010 | Song et al. |
| 2011/0066454 A1 | 3/2011 | Rosauer et al. |
| 2011/0161117 A1 | 6/2011 | Busque et al. |
| 2011/0251917 A1 | 10/2011 | Etzioni et al. |
| 2012/0253852 A1 | 10/2012 | Pourfallah et al. |
| 2012/0323609 A1* | 12/2012 | Fini ................. G06Q 10/10 705/4 |
| 2013/0262156 A1 | 10/2013 | Ketzef |
| 2014/0081675 A1 | 3/2014 | Ives et al. |
| 2014/0122134 A1 | 5/2014 | Fini |
| 2014/0180725 A1 | 6/2014 | Ton-That et al. |
| 2014/0278573 A1 | 9/2014 | Cook |
| 2014/0279474 A1 | 9/2014 | Evans et al. |
| 2015/0006206 A1 | 1/2015 | Mdeway |
| 2015/0127430 A1 | 5/2015 | Hammer, III |
| 2015/0178851 A1 | 6/2015 | Dutt et al. |
| 2015/0206249 A1 | 7/2015 | Fini |
| 2016/0035038 A1 | 2/2016 | Perkins |
| 2016/0180468 A1 | 6/2016 | Buss et al. |
| 2016/0232615 A1 | 8/2016 | Weiliang |
| 2017/0323319 A1 | 11/2017 | Rattner et al. |
| 2019/0005586 A1 | 1/2019 | Lei et al. |
| 2019/0080325 A1 | 3/2019 | Pourfallah et al. |
| 2020/0302322 A1 | 9/2020 | Tukiainen et al. |
| 2021/0090177 A1 | 3/2021 | Sears |

\* cited by examiner

SYSTEMS AND METHODS FOR GENERATING AND UPDATING AN INVENTORY OF PERSONAL POSSESSIONS OF A USER FOR INSURANCE PURPOSES

FIELD OF THE DISCLOSURE

The present disclosure relates to generating and updating an inventory of personal possessions, and more particularly, to computer-based systems and methods for generating and updating an inventory of personal possessions owned by a user for insurance related purposes.

BACKGROUND

Some insurance policies (e.g., renter's insurance, rental insurance, homeowners insurance, and/or property insurance) provide coverage for loss or damage to the personal possessions of a policyholder during a policy claim (e.g., a formal request by the policyholder to an insurance provider for reimbursement for one or more personal possessions covered under an insurance policy). Loss events may include residential fires, theft, vandalism and/or other events that cause partial or complete loss of the personal possessions of the policyholder. Policy coverage is associated with the amount of risk or liability that is covered by the insurance provider for the policyholder's possessions during these loss events. Insurance providers set policy premiums based at least in part upon a number of factors including the amount of coverage that the policy provides (e.g., policy coverage or insurance coverage). In other words, the policy coverage is related to the amount of funds an insurance provider may have to pay a policyholder for damaged or lost possessions. As such, a policy coverage amount should aim to cover the amount it would cost to replace or repair each of the policyholder's personal possessions.

During a policy claim, the policyholder may submit an insurance claim request to the insurance provider, requesting reimbursement for lost or destroyed possessions. The insurance claim request may include a list of the personal possessions and values associated with the cost of replacing the personal possessions.

In some cases, the policyholder may not have created an inventory list of their personal possessions prior to the loss event. Consequentially, the policyholder may be unable to remember or identify all personal possessions that were destroyed, lost, and/or damaged. It may be particularly challenging for a policyholder to recall personal possessions in the case of a total loss, when there may be limited evidence of the policyholder's possessions (e.g. after a residential fire). As such, the policyholder may be unable to create a complete and/or accurate list of possessions for the policy claim. In other cases, a policyholder may have created an inventory list prior to the loss event, but failed to update or maintain the list such that the inventory list does not accurately reflect the most current personal possessions of the policyholder.

Further, upon receiving the policy claim request, the insurance provider may subsequently request documentation or proof from the policyholder for one or more items in the list of possessions in order to confirm that the policyholder owned the item and/or to verify the cost or value associated with the item. Requested documentation may include images of the items, receipts, or authentication documentations such as titles, certifications of authenticity, or any other documentation that can be used to verify the value of the possessions. In some cases, the policyholder may be unable to provide documentation supporting the claimed lost items. For example, in some cases, the policyholder's documents may have been lost or destroyed during the loss event. In other cases, the policyholder may not have kept or recorded documentation for every personal possession.

Insurance premiums, coverage rates, and insurance claims may depend on the list of policyholder's possessions owned by the policyholder. It would be advantageous for both the policyholder and the insurance provider to generate and update a complete and accurate list of personal possessions. The inventory of personal possessions should further include a cost or value assigned to each possession in the inventory of personal possessions, and documentation of the ownership and/or the value of the possessions. More specifically, the inventory of personal possessions may aid the insurance provider in determining policy rates and additionally aid the policyholder in determining the amount of coverage they will need. Further, during a policy claim, the inventory list may be used to determine reimbursement amounts for each possession.

BRIEF SUMMARY

The present embodiment may relate to systems and methods systems and methods for generating and updating a list of personal possessions of a user based at least in part upon personal data associated with the user.

In one aspect, a computer system for generating a list of items predicted to be associated with a candidate user is provided, and the computer system may include one processor in communication with at least one memory device. The at least one processor may be configured to: (i) generate a predictive possession model based at least in part upon a plurality of historical policyholder records associated with a plurality of policyholders, the plurality of historical policyholder records includes one or more historical insurance claims that includes one or more items owned by the plurality of policyholders and personal data associated with the plurality of policyholders, (ii) receive personal data associated with the candidate user, (iii) predict a first set of items owned by the candidate user based at least in part upon the received personal data associated with the candidate user and the generated predictive possession model, (iv) assign a value and a range of predesignated values for each item included in the first set of items, (v) cause the first set of items and their corresponding values to be displayed on a user device of the candidate user, and (vi) prompt the candidate user to input confirmation data including one of (a) a confirmation that the first set of items accurately describes a set of actual items possessed by the candidate user and (b) a confirmation that the values corresponding to the first set of items are satisfactory. The computer system may include additional, less, or alternate functionality, including that discussed elsewhere herein.

In another aspect, a computer-implemented method for generating a list of items predicted to be associated with a candidate user using a computer system including one processor in communication with at least one memory device is provided. The method may include: (i) generating a predictive possession model based at least in part upon a plurality of historical policyholder records associated with a plurality of policyholders, the plurality of historical policyholder records includes one or more historical insurance claims that includes one or more items owned by the plurality of policyholders and personal data associated with the plurality of policyholders, (ii) receiving personal data associated with the candidate user, (iii) predicting a first set of items owned by the candidate user based at least in part upon the received personal data associated with the candidate user and the generated predictive possession model, (iv) assigning a value and a range of predesignated values for each item included in the first set of items, (v) causing the predictive set of items and corresponding values to be displayed on a user device of the candidate user, and (vi) prompting the candidate user to input confirmation data including one of (a) a confirmation that the first set of items accurately describes a set of actual items possessed by the candidate user and (b) a confirmation that the values corresponding to the first set of items are satisfactory. The method may include additional, less, or alternate actions, including those discussed elsewhere herein.

In yet another aspect, at least one non-transitory computer-readable media having computer-executable instructions thereon is provided, wherein when executed by at least one processor of a computer system causes the at least one processor to: (i) generate a predictive possession model based at least in part upon a plurality of historical policyholder records associated with a plurality of policyholders, the plurality of historical policyholder records includes one or more historical insurance claims that includes one or more items owned by the plurality of policyholders and personal data associated with the plurality of policyholders, (ii) receive personal data from a candidate user, (iii) predict a first set of items owned by the candidate user based at least in part upon the received personal data associated with the candidate user and the generated predictive possession model, (iv) assign a value and a range of predesignated values for each item included in the first set of items, (v) cause the first set of items and their corresponding values to be displayed on a user device of the candidate user, (vi) prompt the candidate user to input confirmation data including one of (a) a confirmation that the first set of items accurately describes a set of actual items possessed by the candidate user and (b) a confirmation that the values corresponding to the first set of items are satisfactory. The instructions may direct additional, less, or alternate functionality, including that discussed elsewhere herein.

Depending upon embodiment, one or more benefits may be achieved. These benefits and various additional objects, features and advantages of the present invention can be fully appreciated with reference to the detailed description and accompanying drawings that follow.

Figure 1:
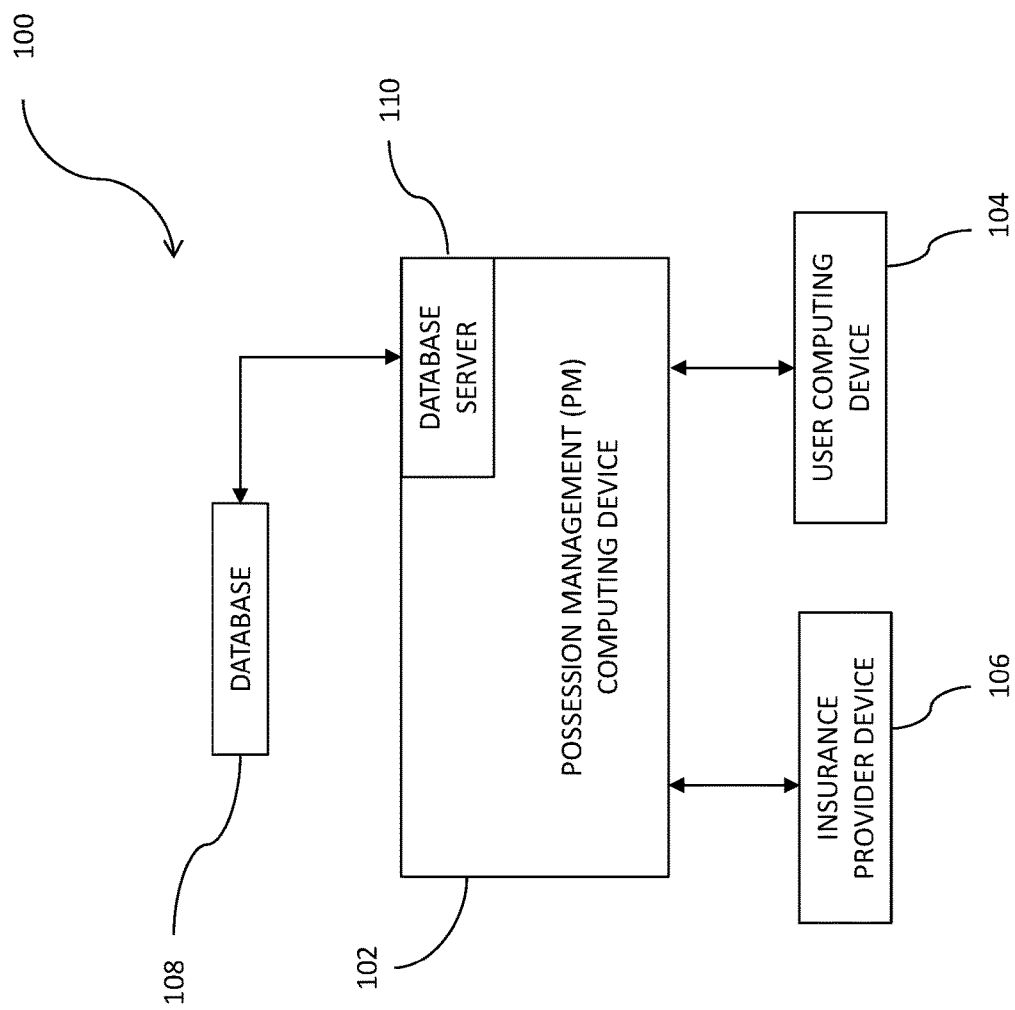
FIG. 1 illustrates a simplified block diagram of an exemplary possession management (PM) computer system.

The Figures depict preferred embodiments for purposes of illustration only. One skilled in the art will readily recognize from the following discussion that alternative embodiments of the systems and methods illustrated herein may be employed without departing from the principles of the disclosure.

DETAILED DESCRIPTION OF THE DRAWINGS

The present embodiments may relate to, inter alia, systems and methods for generating and updating a list of personal possessions of a user based at least in part upon personal data associated with the user. The list (also referred to herein as an inventory and a set) may be used in determining an insurance premium and/or policy for the user. In one exemplary embodiment, the systems and methods may be associated with and/or performed by a possession management ("PM") computing device (also referred to herein as a PM server, a PM computing system, and a PM computer system), and the PM computing device may be associated with an insurance provider.

The systems and methods described herein may generate a possession model for predicting personal possessions predicted to be associated with a user based at least in part upon personal data of the user, and the predicted list of personal possessions may be used for insurance purposes (e.g., renter's insurance, rental insurance, homeowners insurance, and/or property insurance that provide insurance coverage of personal property). The systems and methods described herein generate a comprehensive and descriptive inventory list of personal possessions that may be validated by the user with minimal input (e.g., a single click) from the user, such that the user may obtain and/or accurately submit an insurance claim for a comprehensive insurance policy for the personal possessions of the user. The inventory of personal possessions may include a set of personal possessions, a value assigned to each personal possession associated with the cost of the personal possession, and in some cases, documentation that may be used to validate the value and/or the ownership of the personal possession.

The systems and methods described herein may utilize a historical policyholder database to generate the possession model that may be used to create a set of predicted personal possessions predicted to be owned by a candidate user. The possession model may also assign a predicted value and a predicted range of values to each of the predicted personal possessions contained in the set of predicted personal possessions. The predicted value and the predicted range of values may be associated with the cost of replacing any such corresponding personal possession. The systems and methods described herein may further prompt the candidate user to review the set of predicted personal possessions for accuracy. Further, the user may be able to adjust and/or correct values assigned to one or more predicted personal possessions included in the set of predicted personal possessions. In other words, the user may correct the set of predicted personal possessions by adjusting the predicted values assigned to the personal possessions and/or remove or add personal possessions from the set of predicted personal possessions, or if all predicted information is accurate, the candidate user can select a single input button to approve (e.g., through a single click) the list of predicted items as the actual inventory of the candidate user. In the event that the user adjusts a value of a possession outside a range of pre-designated values, the user may be prompted to provide additional details or documentation for the value of the personal possession. The predesignated values are values that the system determines and stores as a likely range of values for a similar type of item. The process may be iterated until a complete and accurate list (e.g., the actual inventory) of personal possessions of the user is generated.

Examples of Inventory of Personal Possessions

In the exemplary embodiment, the PM computing system may include a PM computer server or device and may be commutatively linked to one or more databases (e.g., a historical policyholder database). The historical policyholder database may include a plurality of historical policyholder records associated with a plurality of policyholders. Each of the plurality of historical policyholder records may include a set of personal data associated with the policyholders and an inventory of personal possessions (e.g., electronic devices, personal transportation items, like bikes and scooters, computers/laptops, furniture, jewelry, clothing, etc.) owned by each policyholder and historical insurance claims. The set of personal data may include demographic and location data (e.g., age, sex, occupation, education level, marital status, family size, household address, residence city/state, etc.) associated with the policyholders. The inventory, for example, may be the inventories of personal possessions supplied by the policyholders when the policyholders first obtained insurance coverage for the personal possessions. The inventory of personal possessions may further include an assigned value (e.g., associated with the cost to repair or replace the personal possession) associated with each personal property item included in the list of personal possessions. The assigned value, for example, may be included in the list of personal possessions supplied by the policyholders (e.g., the policyholders may include an estimated value for each item included in the list of personal possessions) and/or the assigned value may be assigned to each item by the PM system (e.g., the PM system may perform a search, like an internet search, for the value associated with each item of the list of personal possessions).

Examples of Possession Model Generation

In the exemplary embodiment, the PM system may retrieve, from the historical policyholder database, at least a subset of the historical policyholder records that include personal data and an inventory of the personal possessions of the policyholders associated with the historical policyholder records. This subset of historical policyholder records may be used to generate a possession model that relates the personal data to the inventory of personal possessions for the policyholders. For example, the PM system may find that nearly all 35-year-old men own a bike.

The possession model may further predict a pre-designated value associated with each personal possession of the predicted inventory of personal possessions. The pre-designated values may be associated with a cost to repair or replace the personal possession. The possession model may further include a pre-designated range of values associated with a confidence estimate (e.g., a percentage of confidence that the value of the personal possession falls within the range of values). The confidence estimate may be a fixed value (e.g., as set by an insurance provider) for each user, or the confidence value may change from user to user. For example, the range of values may be associated with the PM system having 95% confidence that the value of the predicted personal possession falls within the range of values. Further, for example, the PM system may predict that the range of values associated with the bikes of 35-year-old men ranges from $300 to $500 in 95% of instances where 35-year-old men own a bike.

The possession model may be generated using any suitable technique (e.g., machine learning, artificial intelligence, neural networks, etc.), as further described herein.

Examples of Predicting Personal Possessions and Corresponding Value Ranges for a User Users (e.g., candidate users) may wish to register and/or enroll in a possession management (PM) service associated with the PM system when the users need an inventory of the personal possessions of the users. For example, a user may want to obtain comprehensive insurance coverage for the personal possessions of the user without having to go through the timely process of creating an inventory of each item that the user owns. Further, for example, a user (e.g., a policyholder) may have insurance coverage for the personal possessions of the user, and the user may need a full inventory of the personal possessions to file a complete insurance claim in response to a claim event (e.g., a flood, fire, tornado, robbery, etc.). The PM system may prompt the users to enter personal data (e.g., age, sex, income level, employment status, marital status, etc.) associated with the users when the users enroll and/or register with the PM service.

The PM system may utilize the possession model to generate an inventory of predicted personal possessions that are predicted to be owned by a user and a pre-designated value and range of values associated with each personal possession of the inventory of personal possessions based at least in part upon the personal data associated with the user. In other words, the PM system may utilize the set of personal data as an input to the possession model to generate inventory of predicted personal possessions for the user.

For example, a user may provide the PM system with personal data indicating that the user is a 21-year-old female attending a university. The PM system may input the personal data of the user into the possession model of the PM system, and the PM system may predict that the user owns clothing, a bicycle, a laptop, and a television. The PM system may further predict that (i) a predesignated value of the clothing is $600 with a predesignated range of $300 to $1200, (ii) a predesignated value of the bicycle is $300 with a predesignated range of $200 to $300, (iii) a predesignated value of the laptop is $800 with a predesignated range of $600 to $1300, and (iv) a predesignated value of the television is $250 with a predesignated range of $200 to $350.

Examples of User Interaction

After the possession model generates the inventory of personal possessions based at least in part upon the personal data of the user, the PM system may prompt the user to confirm the accuracy of the inventory. For example, the PM system may display the inventory of personal possessions and assigned values of each personal possession on a computing device (e.g., mobile device and/or computer) of the user. In some embodiments, the PM system may also display the predesignated range of values for each personal possession. The user may go through the inventory and confirm that the user owns each item of the inventory and that the assigned value is correct. For example, the PM system may display a checkbox that corresponds to each item of the inventory, and the user may check the checkbox (e.g., on the computing device of the user) for each item that the user owns. By checking the checkbox, the user may confirm both that the user owns the item and that the assigned value of the item is correct. For example, if the PM system displays a predicted inventory of a bike with an assigned value of $300, a television with a predicted value of $500, and jewelry with an assigned value of $200, and the user owns each of these items and determines that the assigned values of the items are correct, the user may check the checkbox that corresponds to each of the items. Additionally or alternatively, if all of the predicted items of the inventory and the corresponding assigned values are correct, the user may use a single click (e.g., by clicking a "Select All" button) that confirms that all of the items and corresponding values are correct without the user having to individually click each item.

In the exemplary embodiment, the PM system may prompt the user to adjust the assigned value of items in the predicted inventory if the assigned values are incorrect. For example, the user may determine that the predicted value assigned to an item of the inventory does not accurately reflect the cost of the possession. For example and referencing the above example, the user may determine that the jewelry does not have an assigned value of $200, rather the user may determine that the jewelry has a value of $500. Accordingly, the user may adjust the assigned value of the jewelry through the PM system.

In the exemplary embodiment, the PM system may compare the adjusted values, provided by the user, to the range of predesignated values associated with the personal possession. If the adjusted values lie within the range of predesignated values, the PM system may accept the adjusted values without further input from the user. However, if the adjust value is outside of the range of predesignated values, the PM system may prompt the user to submit documentation (e.g., proof of purchase, receipt from the purchase, pictures of the item, etc.) confirming the value of the possession. For example, the PM system may determine that a user has a bike with an assigned value of $500 and a predesignated range of values from $300 to $700 (e.g., related to the value of the bike falling within the predesignated range in 95% of cases). However, the bike of the user (e.g., a bike hobbyist) may have an actual value of $1500. Since the actual value of the bike is outside of the predesignated range (e.g., is a case of the 5%), the PM system may need additional documentation on the bike.

In the exemplary embodiment, the PM system only prompts the users for additional documentation for possessions that do not have standard values (e.g., for possessions that fall outside of the range of predesignated values). Accordingly, the PM system needs minimal input from the users due to the possession model and confidence levels that the user owns each of the items.

Once all of the items of the inventory of personal possessions and the values associated with the items have been acknowledged, adjusted, and/or verified, the PM system may create and store a final inventory (e.g., an actual inventory) associated with the user. The actual inventory may represent all of the personal possessions of the user and the values associated with each personal possession. The actual inventory may include an adjusted inventory of predicted personal possessions, in which values assigned to one or more possessions have been adjusted.

Examples of Generating Insurance Policies and Insurance Claims

In some embodiments, the actual inventory of personal possessions may be used to set a rate for an insurance premium. The set of personal possessions and assigned values and range of acceptable values may be used to predict the cost of a total loss (e.g., the sum of the values for each possession or in some cases, the sum the upper range of acceptable values). For example, a user wishing to obtain insurance coverage for personal possessions owned by the user may use the PM system to generate an actual inventory of the personal possessions and the values associated with the personal possessions. The inventory may be used by an insurance company (e.g., which may be associated with the PM system) to decide on an insurance premium that covers the personal possessions.

Further, the inventory of personal possession may be used to generate a complete and accurate inventory of personal possessions of a user (e.g., a policyholder) who already has an insurance policy covering the personal possessions. For example, in a claim event (e.g., a fire, robbery, natural disaster, etc.), the user may need to generate an actual inventory of personal possessions associated with the user for the insurance claim. If the user has not maintained an inventory of personal possessions and the personal possessions were damaged in the claim event, the user may utilize the PM system to determine an inventory of personal possessions.

At least one technical problems addressed by this system may include: (i) inability of the user to create and maintain an inventory of personal possessions owned by the user, (ii) inability to confirm the value or ownership of personal possession of a user, and (iii) inability to receive adjustments from a user for values assigned to possessions in an inventory of personal possessions.

The methods and systems described herein may be implemented using computer programming or engineering techniques including computer software, firmware, hardware, or any combination thereof, where the technical effect may be achieved by performing at least one of the following steps: (a) generating a predictive possession model based at least in part upon a plurality of historical policyholder records associated with a plurality of policyholders, the plurality of historical policyholder records includes one or more historical insurance claims that includes one or more items owned by the plurality of policyholders and personal data associated with the plurality of policyholders, (b) receiving personal data from a candidate user, (c) predicting a first set of items owned by the candidate user based at least in part upon the received personal data associated with the candidate user and the generated predictive possession model, (d) assigning a value and a range of predesignated values for each item included in the first set of items, (e) causing the predictive set of items and corresponding values to be displayed on a user device of the candidate user, and (f) prompting the candidate user to input confirmation data including one of (i) a confirmation that the first set of items accurately describes a set of actual items possessed by the candidate user and (ii) a confirmation that the values corresponding to the first set of items are satisfactory.

At least one technical solution addressed by this system may include: (i) enable a user, an insurance provider, and the PM system to generate and update an accurate set of personal possessions associated with the user, (ii) predict the inventory of personal possessions based at least in part upon minimal input from the user (e.g., the user only provides personal data), (iii) request users to provide documentation of ownership of personal possessions only in rare instances (e.g., when the value of the personal possessions fall outside of an acceptable range of values), and (iv) updating the set of personal possessions based at least in part upon the adjustment made by the user to create and accurate inventory of the personal possessions of the user.

Exemplary Computer Networks

FIG. 1 depicts an exemplary possession management (PM) system 100 that may be used in generating a list of items predicted to be associated with a user. In the exemplary embodiment, PM system 100 may include a possession management (PM) computing device 102.

In the exemplary embodiment, PM computing device 102 is in communication with a user computing device 104 and an insurance provider device 106. PM computing device 102 is also in communication with a database 108 and may communicate with database 108 through a database server 110. In some embodiments, database server 110 is a component of PM computing device 102. In other embodiments, database server 110 is separate from PM computing device 102. In the illustrated embodiment, insurance provider device 106 is separate from PM computing device 102. In other embodiments, PM computing device 102 may be a component of insurance provider device 106. In some embodiments, PM system 100 may include a plurality of PM computing devices 102, user computing devices 104, insurance provider devices 106, and/or databases 108.

In the exemplary embodiment, user computer device 104 may be computers that include a web browser or a software application, which enables user computer device 104 to access remote computer devices, such as PM computing device 102, using the Internet or other network. More specifically, user computer device 104 may be communicatively coupled to PM computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User computer device 104 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, user computer device 104 may be associated with a user (e.g., a user 302 shown in FIG. 3).

Insurance provider device 106 may be communicatively coupled with PM computing device 102. In some embodiments, insurance provider device 106 may be associated with, or is part of a computer network associated with an insurance provider, or in communication with a computer network of an insurance provider. In other embodiments, insurance provider device 106 may be associated with a third party and is merely in communication with the computer network of the insurance provider. More specifically, insurance provider device 106 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance provider device 106 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 110 may be communicatively coupled to a database 108 (e.g., a historical policyholder database that stores data associated historical policyholders). In one embodiment, database 108 may include a plurality of historical policyholder records. Each historical policyholder record may include a set of personal data associated with the personal data of the policyholders. In addition, each historical policyholder record may include a set of personal possessions owned by the policyholder (e.g., as included in an insurance policy). In the exemplary embodiment, database 108 may be stored remotely from the PM computing device 102. In some exemplary embodiments, the insurance provider may access database 108 via insurance provider device 106 by logging into PM computing device 102, as described herein.

Figure 2:
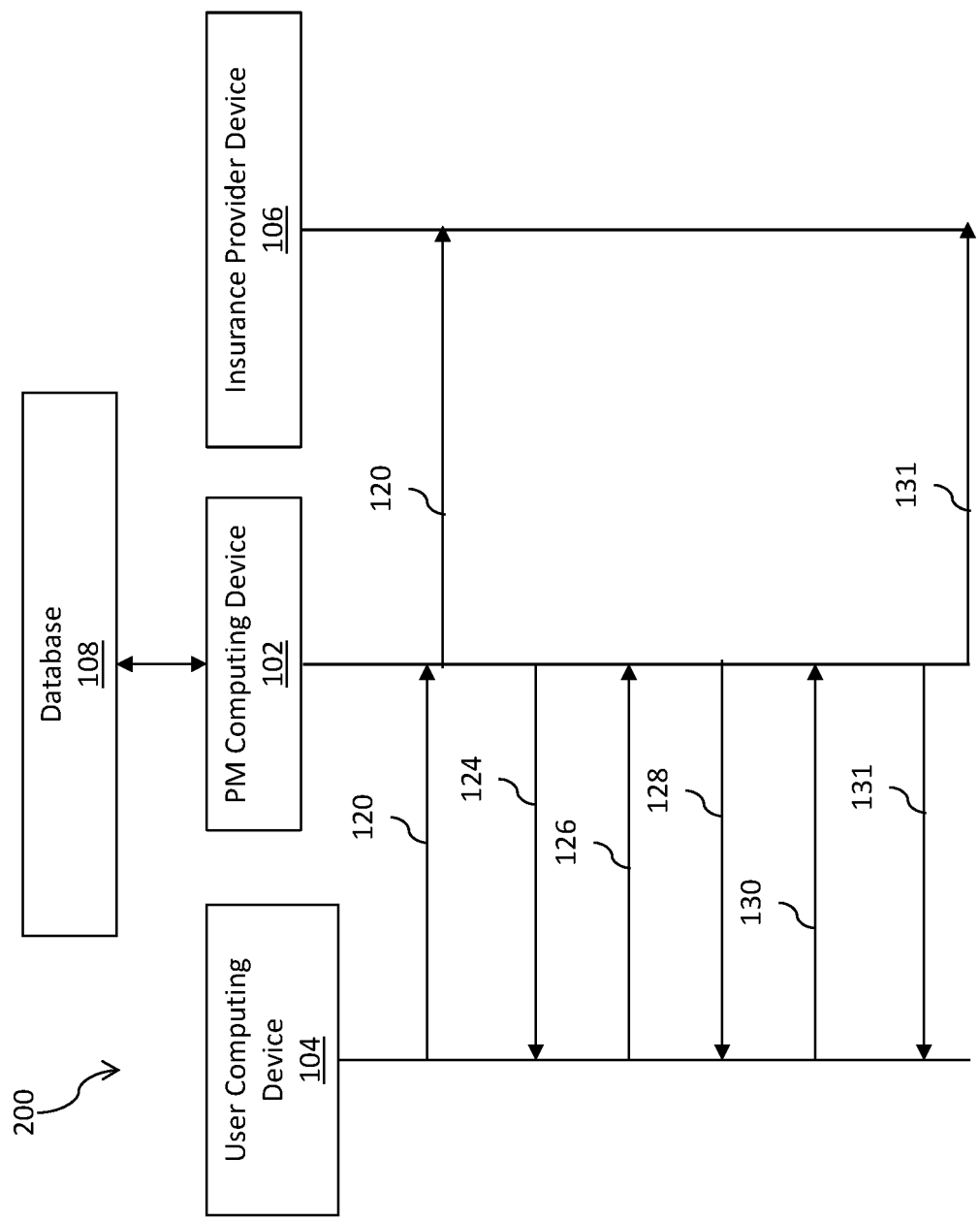
FIG. 2 is a schematic diagram illustrating an exemplary process that may be performed by the PM computer system shown in FIG. 2.

Exemplary Processes for Generating and Updating an Inventory List of Personal Possessions FIG. 2 is a flow diagram of a process 200 that is associated with PM system 100 (shown in FIG. 1) for generating a list of items predicted to be associated with a selected user.

In this exemplary embodiment, PM computing device 102 may access database 108 to retrieve at least a subset of the set of historical policyholder records associated with policyholders. The historical policyholder records may include inventories of personal possessions of the policyholders and personal data associated with the policyholders. PM computing device 102 may use the subset historical policyholder records to determine relationships between the personal data associated with policyholders and the inventory of personal possessions associated with the policyholders, as described in more detail above.

Based at least in part upon the determined relationships between personal data and personal possessions, PM computing device 102 may generate a possession model that relates personal data and personal possessions of users. For example, PM computing device 102 may find that nearly all 35-year-old men own a bike. PM computing device 102 may use the possession model to generate inventories of personal possessions (e.g., personal possessions and/or items predicted to be associated with a user) based at least in part upon personal data for users. In the exemplary embodiment, PM computing device may further predict a pre-designated value associated with each personal possession of the predicted inventory of personal possessions. The pre-designated values may be associated with a cost to repair or replace the personal possession. The possession model may further include a pre-designated range of values associated with a confidence estimate (e.g., a percentage of confidence that the value of the personal possession falls within the range of values). The confidence estimate may be a fixed value (e.g., as set by an insurance provider) for each user, or the confidence value may change from user to user. For example, the range of values may be associated with the PM system having 95% confidence that the value of the predicted personal possession falls within the range of values. Further, for example, the PM system may predict that the range of values associated with the bikes of 35-year-old men ranges from $300 to $500 in 95% of instances where 35-year-old men own a bike.

In the exemplary embodiment, user computing device 104 may transmit a registration 120 to PM computing device 102. Registration 120 may indicate that a user wishes to enroll in a possession management service associated with PM computing device 102. Registration 120 may include a set of personal data (e.g., user data) associated with the user.

The personal data may include demographic data (e.g., age, gender, education, employer, occupation, location of residency, number of rooms in residency, square footage of residency, etc.). Registration 120 may be transmitted from PM computing device 102 to insurance provider device 106. In other embodiments, registration 120 may be transmitted directly from user computing device 104 to insurance provider device 106.

In this exemplary embodiment, PM computing device 102 may transmit a predicted inventory 124 to user computing device 104. Predicted inventory 124 may include, based at least in part upon the possession model and received personal data of the user, a set of predicted personal possessions predicted to be associated with the user and predicted assigned values assigned to each of the predicted personal possessions contained in the set of predicted personal possessions. Predicted inventory 124 may further include a prompt for the user associated with user computing device 104 to review the set of predicted personal possessions and associated assigned values for accuracy.

User computing device 104 may receive predicted inventory 124 and prompt the user (e.g., through a user interface of user computing device 104) to review the set of predicted personal possessions and associated assigned values. In some embodiments, the user associated with user computing device 104, may adjust one or more predicted personal possessions and/or adjust the associated assigned value. For example, predicted inventory 124 may include a television with an assigned value of $500. The user associated with user computing device 104 may determine that the television associated with the user has a value of $1000, and as such, the user, via user computing device 104, may adjust the predicted value of the television from $500 to $1000. In other embodiments, the user associated with user computing device 104 may determine that the set of predicted personal possessions and associated assigned values included in predicted inventory 124 are accurate, and the user may confirm predicted inventory 124 (e.g., using one click).

In this exemplary embodiment, user computing device 104 may transmit an adjusted inventory 126 to PM computing device 102. In some cases, adjusted inventory 126 may include a set of adjusted personal possessions. The set of adjusted predicted possessions may include the set of predicted personal possessions with one or more adjusted possessions and/or one or more adjusted values. For example, user computing device 104 may transmit adjusted inventory 126 including the set of adjusted predicted personal possessions including the television with the adjusted value of $1000. In some embodiments, the user associated with user computing device 104 may remove or add possession to the set of predicted personal possessions. If the user associated with user computing device 104 adds one or more possessions, PM computing device 102 may automatically assign a value to the added possession. In other embodiments, PM computing device 102 may prompt the user computing device 104 to request documentation of the added possession(s). In the exemplary embodiment, adjusted inventory 126 may also include a confirmation from the user that each item and the values associated with the items are actual items possessed by the user.

In this exemplary embodiment, in response to receiving adjusted inventory 126, PM computing device 102 may review the set of adjusted predicted personal possessions included in the received adjusted inventory 126. PM computing device may compare the one or more adjusted values to the range of predesignated acceptable values assigned to the possessions. If the adjusted value is outside the range of predesignated acceptable values, PM computing device 102 may transmit a request 128 for documentation to user computing device 104. Request 128 may include a prompt for the user associated with user computing device 104 to submit documentation associated with the adjusted possession and/or the adjusted value. Documentation may include purchase receipts, certificate of authenticity, proof of purchase, image or video of the possession, or any other type of documentation that may be used to confirm or validate the ownership of the possessions and/or the value of the possession.

Continuing with the example described above, the user associated with user computing device 104 adjusted the television value from $500 to $1000. However, the predesignated acceptable range of values associated with the television may have been $300 to $600. Accordingly, PM computing device 102 may transmit request 128 to user computing device 104 prompting the user to submit documentation that may be used to validate the price of the television being $1000. In other words, if the user has made adjustments to the set of predicted personal possessions such that the value of a possession has been changed outside of the predicted range of acceptable values, PM computing device 102 may request that user computing device 104 submit documentation proving that the adjusted value is accurate and/or prove that the user owns the possession.

In other example embodiments, PM computing device 102 may prompt user to provide documentation for any possession contained in the set of predicted personal possessions. In other words, in some cases PM computing device 102 may request documentation for any possession in the set of predicted personal possessions, regardless of if the user adjusted a predicted value outside the range of acceptable values.

In the exemplary embodiment, user computing device 104 may transmit documentation 130 to PM computing device 102. Documentation 130 may include one or more documents that may be used to confirm that user computing device 104 owns the possession and one or more documents that may be used to validate an adjusted value of the possession. PM computing device 102 may then confirm that documentation 130 validates the adjusted value, and PM computing device 102 may store documentation 130 (e.g., in database 108).

In some cases, the user associated with user computing device 104 may not be able to provide documentation that can be used to verify the cost of the possession. Additionally or alternatively, in some cases, the user associated with user computing device 104 may submit documentation 130 that is not suitable or verifiable. In this case, PM computing device 102 may transmit a decline message (not shown) indicating that documentation 130 was not received or not approved. The decline message may also include a prompt for user computing device 104 to resubmit new documentation or to confirm that the predicted value is accurate. In other embodiments, if the user associated with user computing device 104 is not be able to provide documentation 130 that can be used to verify the cost of the possession, PM computing device 102 may prompt user computing device 104 to re-adjust a value of a personal possession in the inventory of personal possession. Additionally and/or alternatively, PM computing device 102 may suggest a value for a personal possession.

In some embodiments, transmitting and receiving adjusted inventory 126 and request 128 may be repeated in an iterative process until an accurate inventory can be created. In other words, user computing device 104 may transmit any number of adjusted inventories 126 for review by PM computing device 102.

In this exemplary embodiment, PM server may generate and transmit a finalized inventory 131 (e.g., an actual inventory) to user computing device 104. Finalized inventory 131 may include a set of finalized personal possessions, associate values, and documentation associated with the possessions. PM computing device 102 may also transmit finalized inventory 131 to insurance provider device 106. In some cases, insurance provider device 106 may use the set of finalized personal possessions to determine, for example and without limitation, an insurance premium or rate and/or insurance coverage amounts. In some cases, insurance provider device 106 may transmit an insurance policy message (not shown) to user computing device 104. The insurance policy message may include a proposed insurance policy including coverage details and/or policy rates or fees. In some other cases, PM computing device 102 may transmit the insurance policy message to user computing device 104.

Exemplary Policyholder Devices

Figure 3:
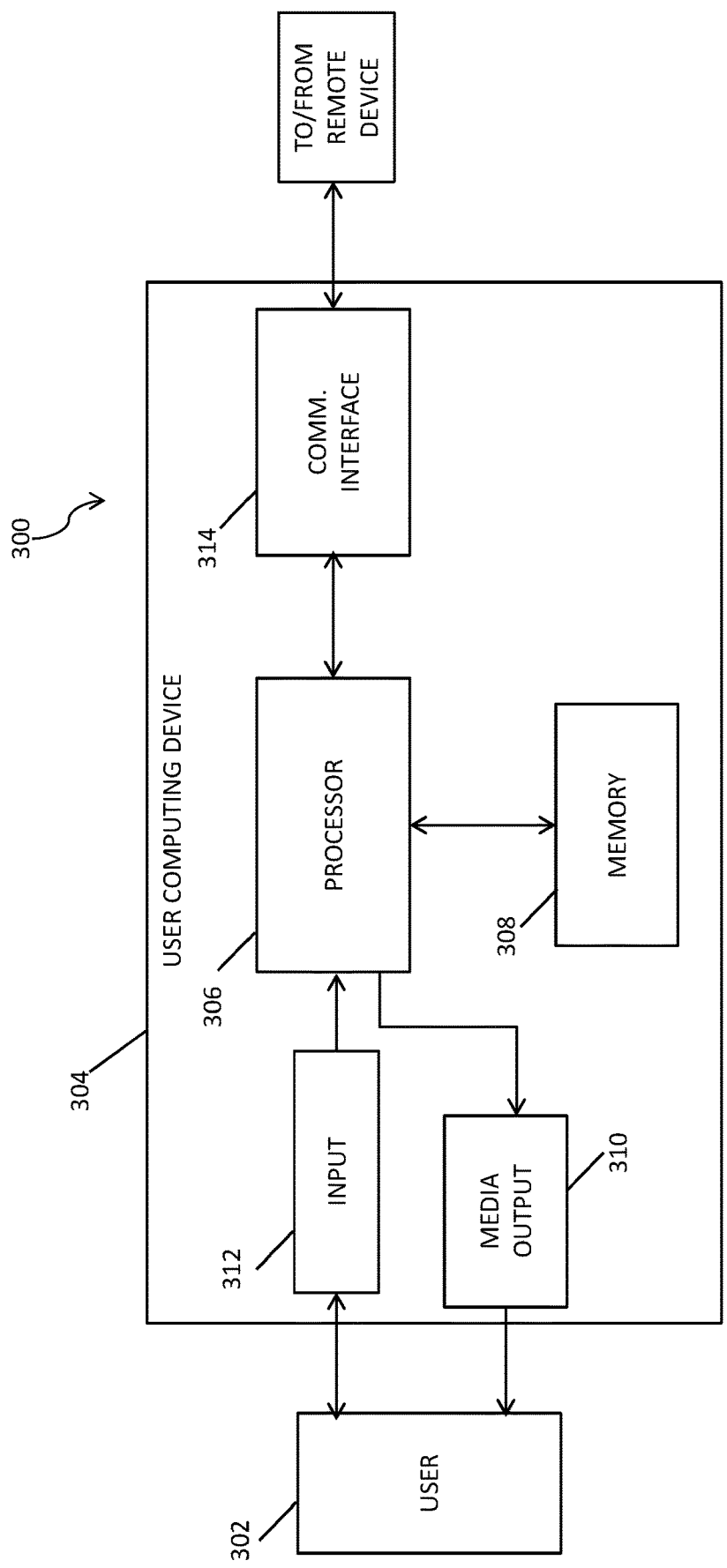
FIG. 3 illustrates an exemplary configuration of a user computer device that may be used with the PM computer system shown in FIG. 1.

FIG. 3 depicts an exemplary configuration 300 of a user computing device 304 (e.g., user computing device 104, shown in FIG. 1 and FIG. 2), in accordance with one embodiment of the present disclosure. User computing device 304 may be operated by a user 302. User computing device 304 may include, but is not limited to, user computing device 104 and insurance provider device 106 (all shown in FIG. 1). User computing device 304 may include a processor 306 for executing instructions. In some embodiments, executable instructions may be stored in a memory 308. Processor 306 may include one or more processing units (e.g. in a multi-core configuration). Memory 308 may be any device allowing information such as executable instructions and/or transaction data to be stored and retrieved. Memory 308 may include one or more computer readable media.

User computing device 304 may also include one media output component 310 for presenting information to user 302. Media output component 310 may be any component capable of conveying information to user 302. In some embodiments, media output component 310 may include an output adapter (not shown) such as a video adapter and/or an audio adapter. An output adapter may be operatively coupled to processor 306 and operatively coupleable to an output device such as a display device (e.g. a cathode ray tube (CRT), liquid crystal display (LCD), light emitting diode (LED) display, or "electronic ink" display) or an audio output device (e.g. a speaker or headphones).

In some embodiments, media output component 310 may be configured to present a graphical user interface (e.g. a web browser and/or a client application) to user 302. A graphical user interface may include, for example, an online store interface for viewing and/or interacting with inventories, requests, documentation, etc. (shown in FIG. 2). In some embodiments, User computing device 304 may include an input device 312 for receiving input from user 302. User 302 may use input device 312 to, without limitation, update and/or adjust inventories and provide documentation.

Input device 312 may include, for example, a keyboard, a pointing device, a mouse, a stylus, a touch sensitive panel (e.g. a touch pad or a touch screen), a gyroscope, an accelerometer, a position detector, a biometric input device, and/or an audio input device. A single component such as a touch screen may function as both an output device of media output component 310 and input device 312.

User computing device 304 may also include a communication interface 314, communicatively coupled to a remote device such as PM computing device 102 (shown in FIG. 3). Communication interface 314 may include, for example, a wired or wireless network adapter and/or a wireless data transceiver for use with a mobile telecommunications network.

Stored in memory 308 are, for example, computer readable instructions for providing a user interface to user 302 via media output component 310 and, optionally, receiving and processing input from input device 312. A user interface may include, among other possibilities, a web browser and/or a client application. Web browsers enable users, such as user 302, to display and interact with media and other information typically embedded on a web page or a website from PM computing device 102. A client application may allow user 302 to interact with, for example, PM computing device 102. For example, instructions may be stored by a cloud service, and the output of the execution of the instructions sent to the media output component 310.

Exemplary Server Devices

Figure 4:
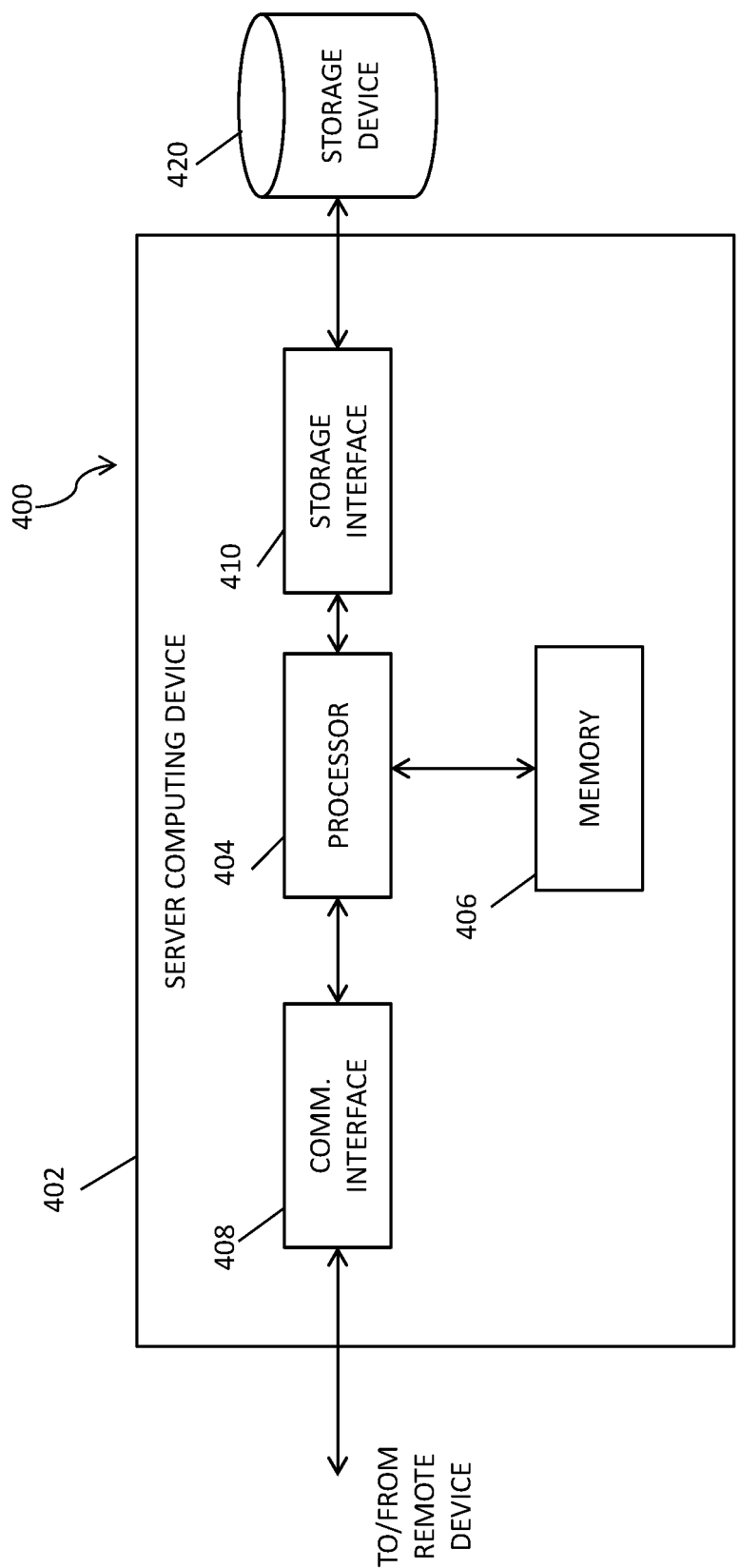
FIG. 4 illustrates an exemplary configuration of a server system that may be used with the PM computer system shown in FIG. 1.

FIG. 4 depicts an exemplary configuration 400 of server system, in accordance with one embodiment of the present disclosure. Server computing device 402 may include, but is not limited to, PM computing device 102 (shown in FIG. 1). Server computing device 402 may also include a processor 404 for executing instructions. Instructions may be stored in a memory area 406. Processor 404 may include one or more processing units (e.g. in a multi-core configuration).

Processor 404 may be operatively coupled to a communication interface 408 such that server computing device 402 is capable of communicating with a remote device such as another server computing device 402, PM computing device 102, insurance provider device 106, and user computing device 104 (shown in FIG. 1).

Processor 404 may also be operatively coupled to a storage device 420. Storage device 420 may be any computer-operated hardware suitable for storing and/or retrieving data, such as, but not limited to, data associated with database 108 (shown in FIG. 1). In some embodiments, storage device 420 may be integrated in server computing device 402. For example, server computing device 402 may include one or more hard disk drives as storage device 420.

In other embodiments, storage device 420 may be external to server computing device 402 and may be accessed by a plurality of server computing devices 402. For example, storage device 420 may include a storage area network (SAN), a network attached storage (NAS) system, and/or multiple storage units such as hard disks and/or solid state disks in a redundant array of inexpensive disks (RAID) configuration.

In some embodiments, processor 404 may be operatively coupled to storage device 420 via a storage interface 410. Storage interface 410 may be any component capable of providing processor 404 with access to storage device 420. Storage interface 410 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 420.

Processor 404 may execute computer-executable instructions for implementing aspects of the disclosure. In some embodiments, the processor 404 may be transformed into a special purpose microprocessor by executing computer-executable instructions or by otherwise being programmed.

Exemplary Computer Devices

Figure 5:
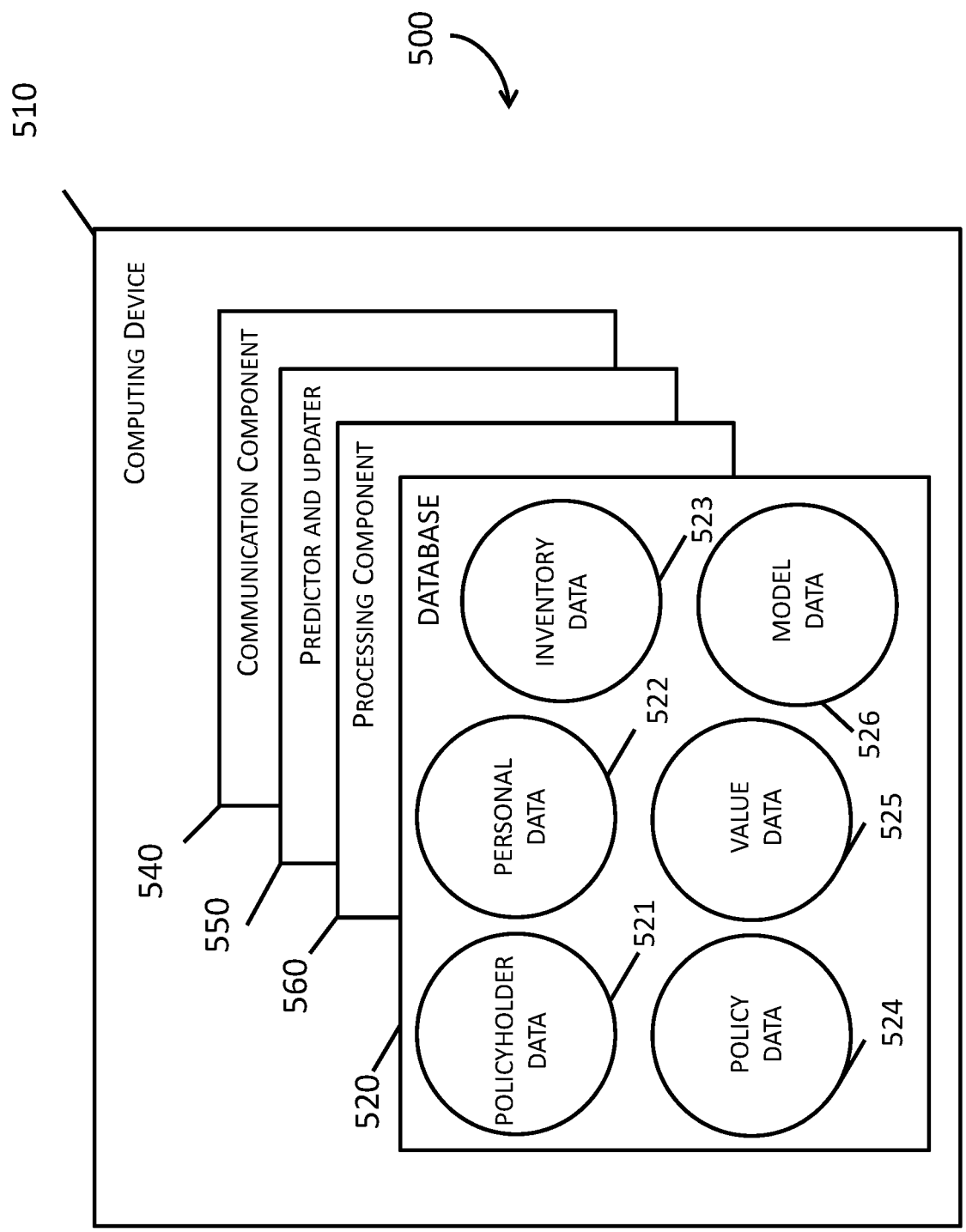
FIG. 5 illustrates a diagram of components of one or more exemplary computing devices that may be used in the PM computer system shown in FIG. 1.

FIG. 5 depicts a diagram 500 of components of one or more exemplary computing devices 510 that may be used in PM system 100 (shown in FIG. 1). In some embodiments, computing device 510 may be similar to PM computing device 102 (shown in FIG. 1).

Database 520 may be coupled with several separate components within computing device 510, which perform specific tasks. In this embodiment, database 520 may include policyholder data 521, personal data 522, inventory data 523, policy data 524, value data 525, and model data 526. In some embodiments, database 520 is similar to database 108 (shown in FIG. 1).

Computing device 510 may include database 520, as well as data storage devices (not shown). Computing device 510 may also include a communication component 540 for interacting with and/or prompting a user. Computing device 510 may further include predictor and updater component 550 for generating and storing predicted inventories. Moreover, computing device 510 may include processing component 560 for receiving and transmitting data, such as policyholder data 521, personal data 522, inventory data 523, policy data 524, value data 525, and model data 526. Computing device 510 may include additional, less, or alternate functionality, including that discussed elsewhere herein.

Figure 6:
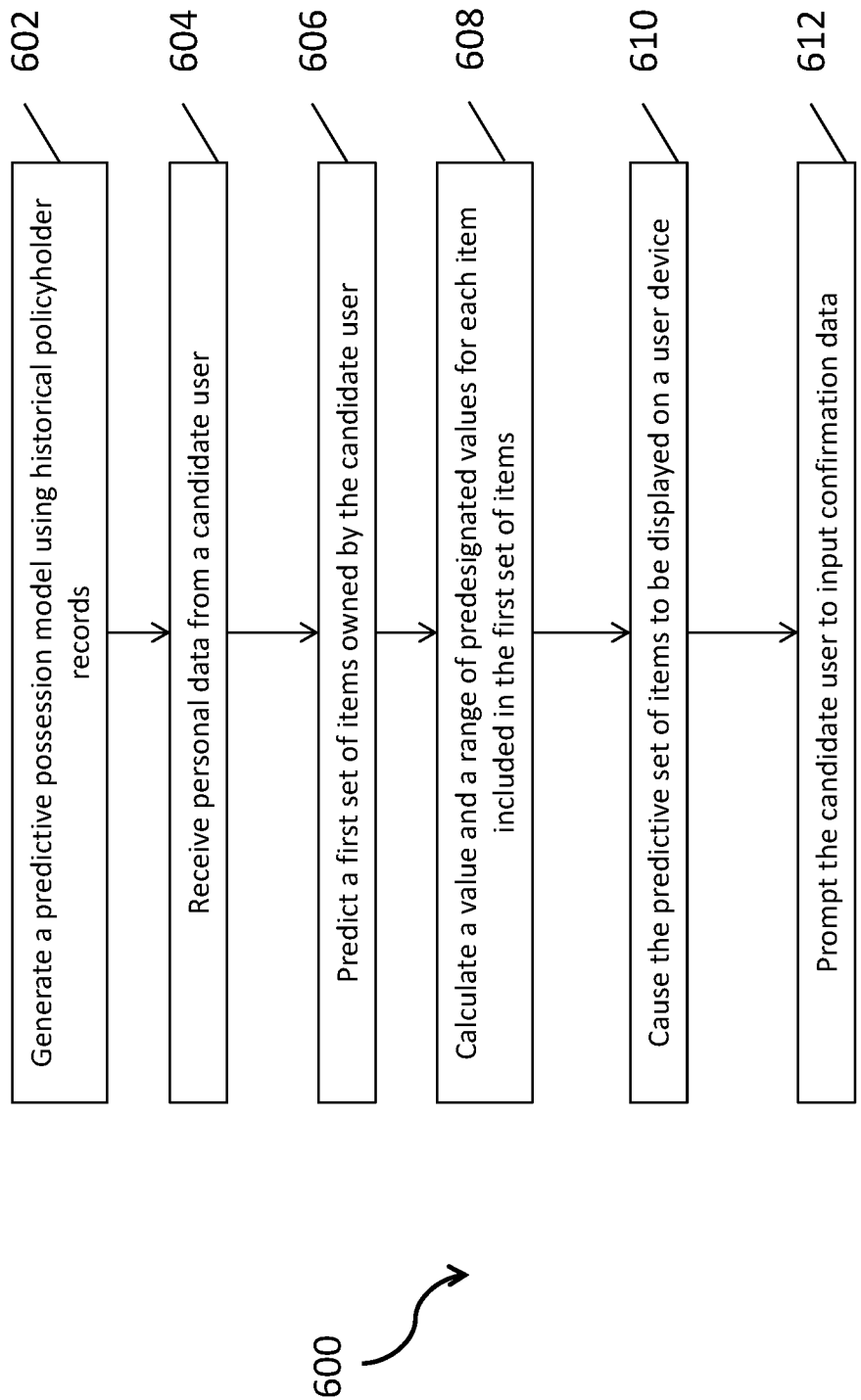
FIG. 6 illustrates a flow chart of an exemplary computer-implemented process for creating a set of personal possessions that may be carried out by the PM computer system shown in FIG. 1.

Exemplary Computer-Implemented Methods for Generating and Maintaining an Inventory of Personal Possessions FIG. 6 illustrates a flow chart of an exemplary computer implemented method 600 for generating a list of items predicted to be associated with a candidate user. Method 600 may be carried out by PM system 100 (shown in FIG. 1), and more specifically, may be carried out by a processor (e.g., processor 404 shown in FIG. 4) of PM system 100.

In the exemplary embodiment, method 600 may include generating 602 a predictive possession model based at least in part upon a plurality of historical policyholder records. The historical policyholder records may be associated with a plurality of policyholders and may include historical insurance claims that include one or more items owned by the plurality of policyholders and personal data associated with the plurality of policyholders. Method 600 may further include receiving 604 personal data from the candidate user.

In the exemplary embodiment, method 600 may further include predicting 606 a first set of items owned by the candidate user using the received 604 personal data from the candidate user and the generated 602 predictive possession model. Method 600 may further include calculating 608 a value and a range of predesignated values for each item included in the first set of items, and causing 610 the predictive set of items and corresponding value to be displayed on a user device of the candidate user.

Method 600 may further include prompting 612 the candidate user to input confirmation data. The confirmation data may include one of (i) a confirmation that the first set of items accurately describes a set of actual items possessed by the candidate user and (ii) a confirmation that the values corresponding to the first set of items are satisfactory.

Exemplary Embodiments & Functionalities

In one embodiment, a computer system for generating a list of items predicted to be associated with a candidate user may be provided. The computing system may include one processor in communication with at least one memory device, and the at least one processor may be configured to: (i) generate a predictive possession model based at least in part upon a plurality of historical policyholder records associated with a plurality of policyholders, the plurality of historical policyholder records includes one or more historical insurance claims that includes one or more items owned by the plurality of policyholders and personal data associated with the plurality of policyholders, (ii) receive personal data associated with the candidate user, (iii) predict a first set of items owned by the candidate user based at least in part upon the received personal data from the selected user and the generated predictive possession model, (iv) assign a value and a range of predesignated values for each item included in the first set of items, (v) cause the first set of items and their corresponding values to be displayed on a user device of the candidate user, and/or (vi) prompt the candidate user to input confirmation data including one of (a) a confirmation that the first set of items accurately describes a set of actual items possessed by the candidate user and (b) a confirmation that the values corresponding to the first set of items are satisfactory. The computer system may include additional, less, or alternate functionality, including that discussed elsewhere herein.

The at least one processor may further be configured to: (i) prompt the candidate user to at least one of add and remove one or more items from the first set of items, (ii) prompt the candidate user to adjust one or more values assigned to the first set of items, (iii) determine, for each item of the first set of items that has an assigned value adjusted, that the adjusted value is within the range of predesignated values assigned to the item, and/or (iv) determine, for each item of the first set of items that has an assigned value adjusted, that the adjusted value is outside of the range of predesignated values assigned to the item and (v) prompt the candidate user to provide documentation that verifies the adjusted value of the item before storing the adjusted value of the item in the at least one memory device as a new value of the item.

The at least one processor may further be configured to: (i) transmit a finalized set of items to the candidate user, wherein the finalized set of items is associated with an accurate set of items associated with the candidate user and (ii) store the finalized set of items in the at least one memory device. In some embodiments, the documentation may include one of a purchase receipt, a proof of purchase, an image of the personal possession, and a video of the personal possession. Further, in some embodiments, the personal data of the candidate user may include one of demographic data, age data, marital status, education, and employment data associated with the candidate user.

In another embodiment, a computer-implemented method for generating a list of items predicted to be associated with a candidate user using a computer system including one processor in communication with at least one memory device may be provided. The method may include: (i) generating a predictive possession model based at least in part upon a plurality of historical policyholder records associated with a plurality of policyholders, the plurality of historical policyholder records includes one or more historical insurance claims that includes one or more items owned by the plurality of policyholders and personal data associated with the plurality of policyholders, (ii) receiving personal data associated with the candidate user, (iii) predicting a first set of items owned by the candidate user based at least in part upon the received personal data from the selected user and the generated predictive possession model, (iv) assigning a value and a range of predesignated values for each item included in the first set of items, (v) causing the predictive set of items and corresponding value to be displayed on a user device of the candidate user, and (vi) prompting the candidate user to input confirmation data including one of (a) a confirmation that the first set of items accurately describes a set of actual items possessed by the candidate user and (b) a confirmation that the values corresponding to the first set of items are satisfactory. The method may include additional, less, or alternate actions, including those discussed elsewhere herein.

In yet another embodiment, at least one non-transitory computer-readable media having computer-executable instructions thereon is provided, wherein when executed by at least one processor of a computer system causes the at least one processor to: (i) generate a predictive possession model based at least in part upon a plurality of historical policyholder records associated with a plurality of policyholders, the plurality of historical policyholder records includes one or more historical insurance claims that includes one or more items owned by the plurality of policyholders and personal data associated with the plurality of policyholders, (ii) receive personal data from a candidate user, (iii) predict a first set of items owned by the candidate user based at least in part upon the received personal data from the selected user and the generated predictive possession model, (iv) assign a value and a range of predesignated values for each item included in the first set of items, (v) cause the predictive set of items and corresponding value to be displayed on a user device of the candidate user, (vi) prompt the candidate user to input confirmation data including one of (a) a confirmation that the first set of items accurately describes a set of actual items possessed by the candidate user and (b) a confirmation that the values corresponding to the first set of items are satisfactory. The instructions may direct additional, less, or alternate functionality, including that discussed elsewhere herein.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs. For example, models may be created based at least in part upon historical policyholder data to predict what personal possessions are associated with users, and more specifically, the personal data of users (e.g., demographics and/or location data).

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs. In one embodiment, machine learning techniques may be used to extract data about the computer device, the user of the computer device, driver and/or vehicle, home owner and/or home, renter, geolocation information, image data, home sensor data, and/or other data.

Based at least in part upon these analyses, the processing element may learn how to identify characteristics and patterns that may then be applied to analyzing sensor data, authentication data, image data, mobile device data, and/or other data. For example, the processing element may learn, with the user's permission or affirmative consent, to predict new personal possessions of the user (e.g., that the user acquires after the actual inventory has been created and/or generated).

Examples of Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g. an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g. magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without needing a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed:

1. A computing system for generating a list of items predicted to be associated with a user, the computing system including one or more processors in communication with at least one memory device, the one or more processors configured to:
generate a predictive possession model based at least in part upon a plurality of historical policyholder records associated with a plurality of policyholders, wherein:
the predictive possession model includes a machine learning model;
the predictive possession model is trained using the plurality of historical policyholder records;
the plurality of historical policyholder records include one or more historical insurance claims that includes one or more items owned by the plurality of policyholders and personal data associated with the plurality of policyholders;
receive personal data associated with the user;
predict, by the generated predictive possession model, a first set of items owned by the user based at least in part upon the received personal data associated with the user, wherein the generated predictive possession model is configured to extract data associated with the first set of items from the received personal data;
assign, by the generated predictive possession model, a value and a range of predesignated values for each item included in the first set of items;
for each item included in the first set of items,
cause information indicative of each item, the assigned value for each item, and the range of predesignated values for each item to be displayed on a user device of the user;
prompt the user to adjust one or more values assigned to the first set of items;
receive an adjusted value for a first item in the first set of items;
determine whether the adjusted value is outside of the range of predesignated values assigned to the first item;
if the adjusted value is within the range of predesignated values assigned to the first item, accept the adjusted value without prompting the user to provide documentation;
if the adjusted value is outside of the range of predesignated values assigned to the first item, prompt the user to provide documentation that verifies the adjusted value of the first item;
receive the documentation that verifies the adjusted value of the first item; and
re-train the generated predictive possession model using the adjusted value of the first item.

2. The computing system of claim 1, wherein the one or more processors are further configured to:
prompt the user to at least one of add and remove one or more items from the first set of items.

3. The computing system of claim 1 wherein the one or more processors are further configured to:
determine, for each item of the first set of items that has an assigned value adjusted, that an adjusted value is within the range of predesignated values assigned to each item.

4. The computing system of claim 1, wherein the one or more processors are further configured to:
store the adjusted value of the first item in the at least one memory device as a new value of the first item.

5. The computing system of claim 4, wherein the one or more processors are further configured to:
transmit a finalized set of items to the user, wherein the finalized set of items include the new value of the first item.

6. The computing system of claim 4, wherein the documentation that verifies the adjusted value of the first item includes one of a purchase receipt, a proof of purchase, an image of the first item, and a video of the first item.

7. The computing system of claim 1, wherein the personal data of the user includes one of demographic data, age data, marital status, education, and employment data associated with the user.

8. A computer-implemented method for generating a list of items predicted to be associated with a user, the method implemented on a computer device including one processor in communication with at least one memory device, said method comprising:
   generating a predictive possession model based at least in part upon a plurality of historical policyholder records associated with a plurality of policyholders, wherein:
      the predictive possession model includes a machine learning model;
      the predictive possession model is trained using the plurality of historical policyholder records;
      the plurality of historical policyholder records include one or more historical insurance claims that includes one or more items owned by the plurality of policyholders and personal data associated with the plurality of policyholders;
   receiving personal data associated with the user;
   predicting, by the generated predictive possession model, a first set of items owned by the user based at least in part upon the received personal data associated with the user, wherein the generated predictive possession model is configured to extract data associated with the first set of items from the received personal data;
   assigning, by the generated predictive possession model, a value and a range of predesignated values for each item included in the first set of items;
   for each item included in the first set of items,
      causing information indicative of each item, the assigned value for each item, and the range of predesignated values for each item to be displayed on a user device of the user;
   prompting the user to adjust one or more values assigned to the first set of items;
   receiving an adjusted value for a first item in the first set of items;
   determining whether the adjusted value is outside of the range of predesignated values assigned to the first item;
   if the adjusted value is within the range of predesignated values assigned to the first item, accepting the adjusted value without prompting the user to provide documentation;
   if the adjusted value is outside of the range of predesignated values assigned to the first item, prompting the user to provide documentation that verifies the adjusted value of the first item;
   receiving the documentation that verifies the adjusted value of the first item; and
   re-training the generated predictive possession model using the adjusted value of the first item.

9. The method of claim 8 further comprising:
prompting the user to at least one of add and remove one or more items from the first set of items.

10. The method of claim 8 further comprising:
determining, for each item of the first set of items that has an assigned value adjusted, that an adjusted value is within the range of predesignated values assigned to each item.

11. The method of claim 8 further comprising:
storing the adjusted value of the first item in the at least one memory device as a new value of the first item.

12. The method of claim 11 further comprising:
transmitting a finalized set of items to the user, wherein the finalized set of items include the new value of the first item.

13. At least one non-transitory computer-readable media having computer-executable instructions thereon, wherein when executed by at least one processor of a computing device, cause the at least one processor to:
   generate a predictive possession model based at least in part upon a plurality of historical policyholder records associated with a plurality of policyholders;
   wherein:
      the predictive possession model includes a machine learning model;
      the predictive possession model is trained using the plurality of historical policyholder records;
      the plurality of historical policyholder records include one or more historical insurance claims that includes one or more items owned by the plurality of policyholders and personal data associated with the plurality of policyholders;
   receive personal data associated with a user;
   predict, by the generated predictive possession model, a first set of items owned by the user based at least in part upon the received personal data associated with the user, wherein the generated predictive possession model is configured to extract data associated with the first set of items from the received personal data;
   assign, by the generated predictive possession model, a value and a range of predesignated values for each item included in the first set of items;
   for each item included in the first set of items,
      cause information indicative of each item, the assigned value for each item, and the range of predesignated values for each item;
   prompt the user to adjust one or more values assigned to the first set of items;
   receive an adjusted value for a first item in the first set of items;
   determine whether the adjusted value is outside of the range of predesignated values assigned to the first item;
   if the adjusted value is within the range of predesignated values assigned to the first item, accept the adjusted value without prompting the user to provide documentation;
   if the adjusted value is outside of the range of predesignated values assigned to the first item, prompt the user to provide documentation that verifies the adjusted value of the first item;
   receive the documentation that verifies the adjusted value of the first item; and
   re-train the generated predictive possession model using the adjusted value of the first item.

14. The computer-readable media of claim 13 further causing the at least one processor to:
prompt the user to at least one of add and remove one or more items from the first set of items.

15. The computer-readable media of claim 13 further causing the at least one processor to:
determine, for each item of the first set of items that has an assigned value adjusted, that an adjusted value is within the range of predesignated values assigned to each item.

16. The computer-readable media of claim 13 further causing the at least one processor to:
store the adjusted value of the first item in the at least one memory device as a new value of the first item.

17. The computer-readable media of claim 16 further causing the at least one processor to:

transmit a finalized set of items to the user, wherein the finalized set of items include the new value of the first item.

\* \* \* \* \*